United States Patent [19]
Suzuki

[11] Patent Number: 5,226,319
[45] Date of Patent: Jul. 13, 1993

[54] HOT WIRE AIR FLOW METER

[76] Inventor: Masayoshi Suzuki, c/o Sawa Works of Hitachi, Ltd., 2520, Takaba, Ooaza, Katsuta-shi, Ibaraki, Japan

[21] Appl. No.: 666,876

[22] Filed: Mar. 8, 1991

[30] Foreign Application Priority Data

Mar. 19, 1990 [JP] Japan .................................. 2-66909

[51] Int. Cl.[5] .............................................. G01F 1/68
[52] U.S. Cl. ............................. 73/204.14; 73/204.18
[58] Field of Search ........... 73/204.19, 204.22, 204.23, 73/204.26, 204.14, 204.18

[56] References Cited

U.S. PATENT DOCUMENTS

| | | | |
|---|---|---|---|
| 3,992,940 | 11/1976 | Platzer, Jr. | |
| 4,548,077 | 10/1985 | van Putten | 73/204.26 |
| 4,548,078 | 10/1985 | Bohrer et al. | 73/204.22 |
| 4,581,929 | 4/1986 | Sugiura | 73/204.19 |
| 4,587,842 | 5/1986 | Handtmann | 73/204.19 |
| 4,693,115 | 9/1987 | Tokura et al. | |
| 4,736,302 | 4/1988 | Kinugawa | |

FOREIGN PATENT DOCUMENTS 0323005 7/1989 European Pat. Off. .
3809110 9/1989 Fed. Rep. of Germany .

OTHER PUBLICATIONS

Patent Abstracts of Japan, Unexamined Applications, P Field, vol. 10, No. 26, Jan. 31, 1986, The Patent Office Japanese Government, p. 117 P 425, Kokai-No. 60-178 317 (Nippon).
Patent Abstracts of Japan, Unexamined Applications, P Field, vol. 10, No. 162, Jun. 10, 1986, The Patent Office Japanese Government, p. 150 P 466, Kokai-No. 61-17 019 (Nippon).

Primary Examiner—Herbert Goldstein
Attorney, Agent, or Firm—Ladas & Parry

[57] ABSTRACT

A hot wire air flow meter for producing a pulse output includes the combination of a hot wire element, for detecting air flow, a cold wire element, for detecting air temperature and an electronic circuit for controlling the current flowing through the hot wire so that the temperature thereof is maintained constant. The output characteristic of the hot wire element is compensated and modified by a zero/span circuit and the output voltage from the circuit is applied to a voltage-frequency conversion circuit which is adapted to provide a pulse output indicative of the air flow rate detected by said hot wire element. The invention resides in mounting the constant temperature control circuit, the zero/-span circuit and the voltage-frequency conversion circuit on a common semiconductor chip to form an integrated circuit. In embodiments of the invention a power transistor for controlling heating current of the hot wire element is either located on said semiconductor chip or disposed separately from said semiconductor chip. In other embodiments, trimming resistor elements are disposed separately outside said semiconductor chip on a hybrid circuit substrate. The invention discloses a surge protection circuit located on the semiconductor chip. In a feature of the invention an integrator-type filter (dulling) circuit as described is provided for eliminating high frequency components caused by electromagnetic disturbance.

45 Claims, 9 Drawing Sheets

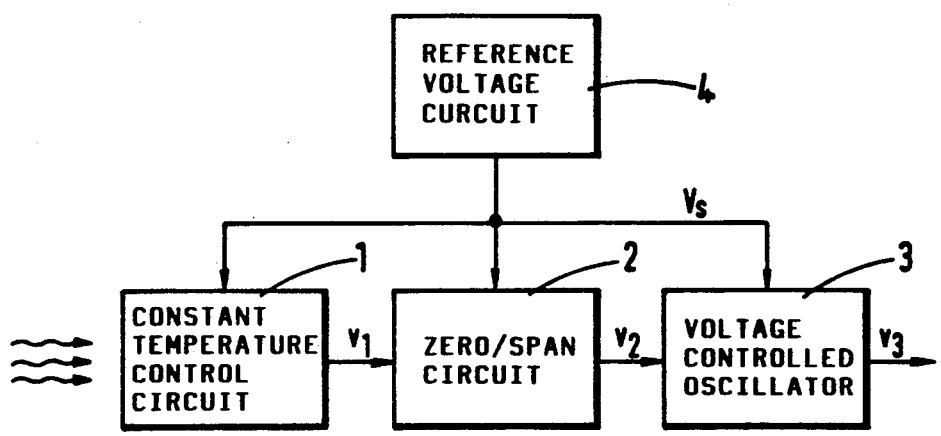
PRIOR ART Fig.1
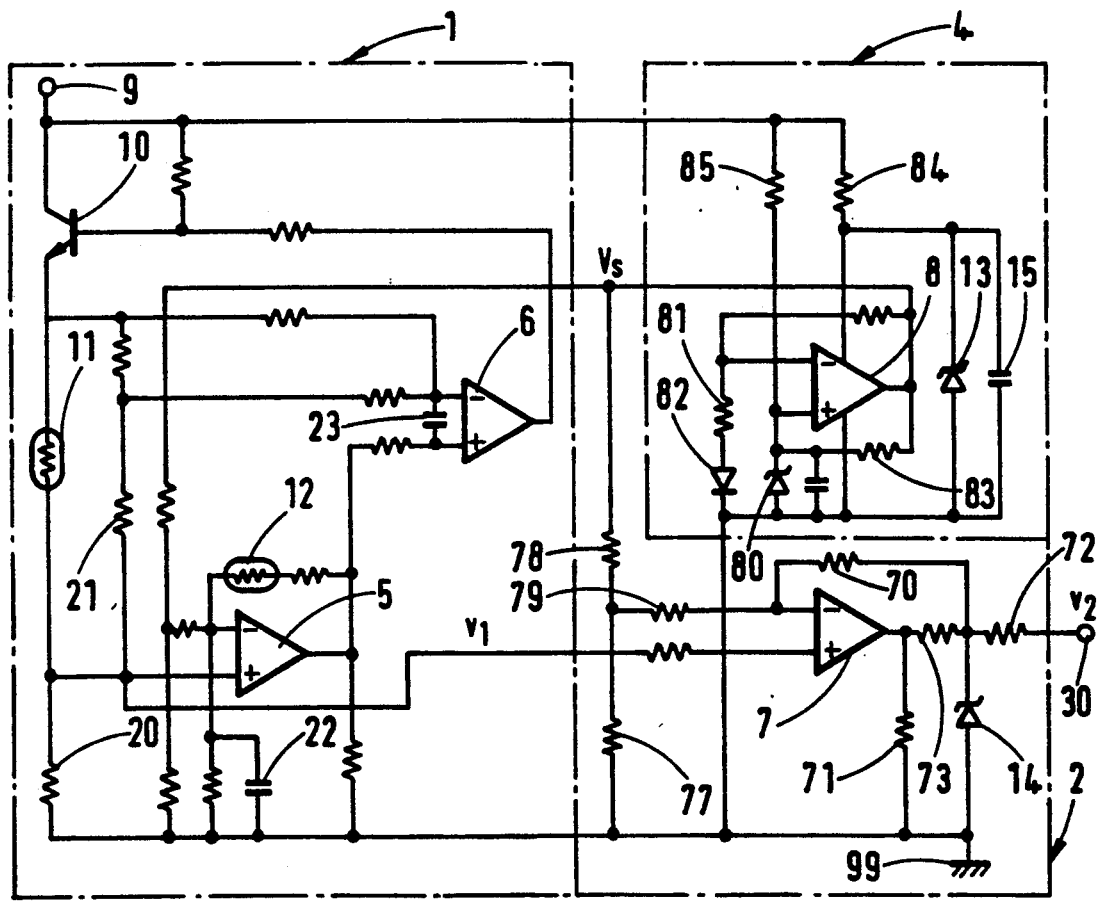
PRIOR ART Fig.2

HOT WIRE AIR FLOW METER

BACKGROUND OF THE INVENTION a) Field of the Invention

The present invention relates to a hot wire air flow meter, said meter being capable of measuring the flow rate of air with a so-called hot wire made of, for example, platinum. In particular, this invention is applicable to a hot wire air flow meter capable of producing a pulsed output function and which is suitable for measurement of intake air flow rate of an internal combustion engine for a motor vehicle.

b) Description of the Prior Art

A block schematic diagram of a hot wire flow meter having a pulsed output function is shown in FIG. 1 in which a constant temperature control circuit 1 is exposed to air flow and the temperature control circuit operates so that the resistance of the hot wire is kept constant thereby maintaining the hot wire temperature constant. The circuit 1 output voltage $v_1$ represents air flow rate Q, but this voltage $v_1$ includes an offset voltage with regard to the flow rate Q, which must firstly be compensated. Thus the voltage $v_1$ is applied to a voltage zeroing circuit to zero the $v_1/Q$ characteristic and the thus compensated characteristic has the gradient (gain) thereof modified by an amplifier. These functions are performed by what is termed herein as a zero/span circuit 2, the output voltage $v_2$ of which is converted into a pulsed frequency by voltage controlled oscillator 3 (herein below abbreviated to VCO) having a pulse voltage $v_3$ with a frequency f proportional to the voltage value $v_2$. A reference voltage circuit 4 provides a reference voltage $V_s$ to the circuits 1-3.

FIG. 2 shows a specific example of the constant temperature control circuit 1, the zero/span circuit 2, and the reference voltage circuit 4. A specific example of the VCO circuit is shown in FIG. 3. These circuits are principally formed by discrete elements, although some parts are formed in an integrated circuit (IC), and the respective elements are usually attached to a hybrid substrate.

The constant temperature control circuit 1 in FIG. 2 has a hot wire 11, a cold wire 12, operational amplifiers 5, 6, a power transistor 10 having its collector connected to a supply voltage terminal 9, a bias resistor 20, a capacitor 22 for suppressing electromagnetic noise on the hot and cold wires and a bias resistor 21 for the operational amplifier 5. A smoothing capacitor 23 is connected across the input of operational amplifier 6. Even when the hot wire 11 is cooled by air, the circuit 1 operates to control the current flowing through the hot wire 11 so that the temperature thereof is always maintained constant.

The zero/span circuit 2 is mainly formed by an operational amplifier 7 and biasing resistors 70-73, and 77-79, and performs zeroing and gain compensation with regard to the signal voltage $v_1$ derived from the interconnection of the hot wire 11 and resistor 20 by properly selecting the resistances 70-73, 77-79. A Zener diode 14 is used for surge protection and an analogue voltage signal $v_2$ is output to terminal 30.

The reference voltage circuit 4 is formed by an operational amplifier 8, resistors such as 81, 83, 84, 85, Zener diodes 80, 13, a diode 82, and capacitor 15. By these elements the constant voltage between both ends of the Zener diode 80 is amplified and the constant voltage $V_s$ which is produced is supplied to the respective circuits 1-3.

The resistor 84, Zener diode 13, and capacitor 15 constitute a surge protection circuit.

The VCO 3 shown in FIG. 3 is formed by operational amplifiers 901 and 24, resistors such as resistors 32, 33, a capacitor 35, and a transistor 34. The amplifier 901 is connected to a bias voltage terminal 902. The circuit of the operational amplifier 901 and the capacitor 35 is configured to function as an integrator, and the circuit composed mainly of the operational amplifier 24, and the resistor 33 is arranged to function as a comparator. When the analog voltage $v_2$ is applied to an input terminal 30, it is converted into a pulse output voltage $v_3$ supplied to terminal 31 having a frequency proportional to the applied voltage $v_2$.

Prior art air flow meters similar to the above are disclosed in, for example:
JP-A-59-224427 (1984)
JP-A-60-178317 (1985)
JP-A-61-1847 (1986)
JP-A-61-17019 (1986)
JP-A-61-104246 (1986)
JP-A-62-79316 (1987).

In the above described prior art, optimization of the circuit construction was not specifically considered, therefore such problems as precision could not be ensured, temperature compensation is poor and electromagnetic wave immunity performance (EMI) is poor. In these respects, the precision in function of the operational amplifiers is principally determined by the ratios of the biasing and feedback resistors and when, for example, the biasing resistors are on one chip and the feedback resistor on another chip, the amplifier cannot provide proper control since the resistors are affected by different temperatures. With regard to EMI, this is caused by interference from, for example, mobile telephones which is picked up by the wires interconnecting chip circuits together.

One object of this invention is to provide a high precision hot wire air flow meter having improved resistance to temperature and electromagnetic wave effects.

It is an object of a feature of this invention to provide an integrator type filter circuit for use in a hot wire air flow meter which is better suited for manufacture on an integrated circuit.

SUMMARY OF THE INVENTION

According to one aspect of this invention there is provided a hot wire air flow meter adapted to produce a pulse output including the combination of a hot wire element for detecting air flow rate, a cold wire element for detecting air temperature, and an electronic circuit for producing said pulse output which circuit includes at least a constant temperature control circuit for controlling the current flowing through the hot wire element to maintain the temperature thereof substantially constant, a zero/span circuit for compensating and modifying the output characteristic of said hot wire element, and a voltage-frequency conversion circuit for receiving output from said zero/span circuit, whereby air flow rate detected by said hot wire element is output as pulse density signals by said voltage-frequency conversion circuit, characterized in that, said constant temperature control circuit, said zero/span circuit, and said voltage-frequency conversion circuit are formed on a common semiconductor chip to form an integrated circuit.

According to a feature of this invention there is provided a circuit for use in a hot wire air flow meter comprising switching means adapted to receive said pulse density signals from said voltage-frequency conversion circuit and to control a current Miller source means, said current Miller source having an output terminal connected to a junction between a serially connected resistance and a capacitance, said resistance and capacitance being connected across a voltage supply source and said junction being adapted to provide a pulsed output voltage having a rising time constant given by the product of the values of the resistance and capacitance and a falling time constant given by the division of the capacitance by the current flowing from the voltage supply source, through the resistance to the current Miller source means.

BRIEF DESCRIPTION OF THE DRAWINGS

FIG. 1 shows a block schematic diagram of a known hot wire air flow meter for producing a pulsed output;

FIG. 2 is a circuit diagram showing one known example of a constant temperature control circuit, a zero/-span circuit and a reference voltage circuit;

In the Figures, like reference numerals denote like parts.

DESCRIPTION OF THE PREFERRED EMBODIMENTS

Figure 4:
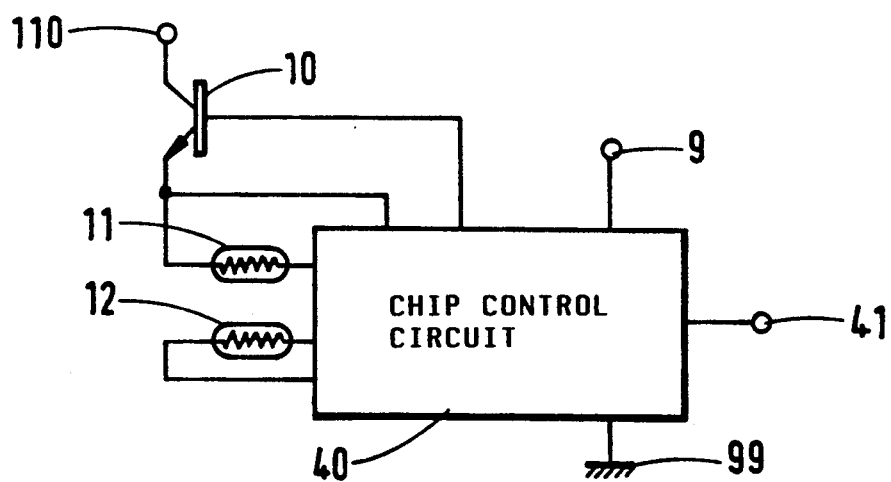
FIG. 4 shows a block schematic diagram of a hot wire type air flow meter according to the present invention.

The hot wire air flow meter shown in FIG. 4 has a hot wire 11 which receives air flow and detects the flow rate and a cold wire 12 which measures the temperature of the air. Both the hot and cold wires are externally of a single chip control circuit 40 having a pulse output function, and these components are disposed in an air passage in which the flow rate is to be measured. The driving power for the elements is provided by the power transistor 10 also located outside the control circuit 40 and also disposed in the air passage. A DC voltage source is applied between ground potential terminal 99 and terminal 9 of the control circuit and terminal 110 connected to the collector of transistor 10. A terminal 41 is a pulse output terminal at which the pulse voltage $v_3$, described above in connection with FIG. 1, is provided.

The one chip circuit is contained in the control circuit 40, and in this circuit, the respective parts of the constant temperature control circuit 1, the zero/span circuit 2, and the VCO 3 in FIG. 1 are integrated. Further, power source terminals 9 and 110 can be combined together.

The control circuit 40 is formed into a single chip so that the volume thereof is small and the respective portions are integrated in a small region. Therefore, the temperature of the various elements within the chip is considered substantially the same, so that it is easier to perform the temperature compensation.

Further, the chip occupies a small area, its extent affected by noise such as electromagnetic wave and surge wave is small so that a sufficient environmental resistance can be provided.

Figure 5:
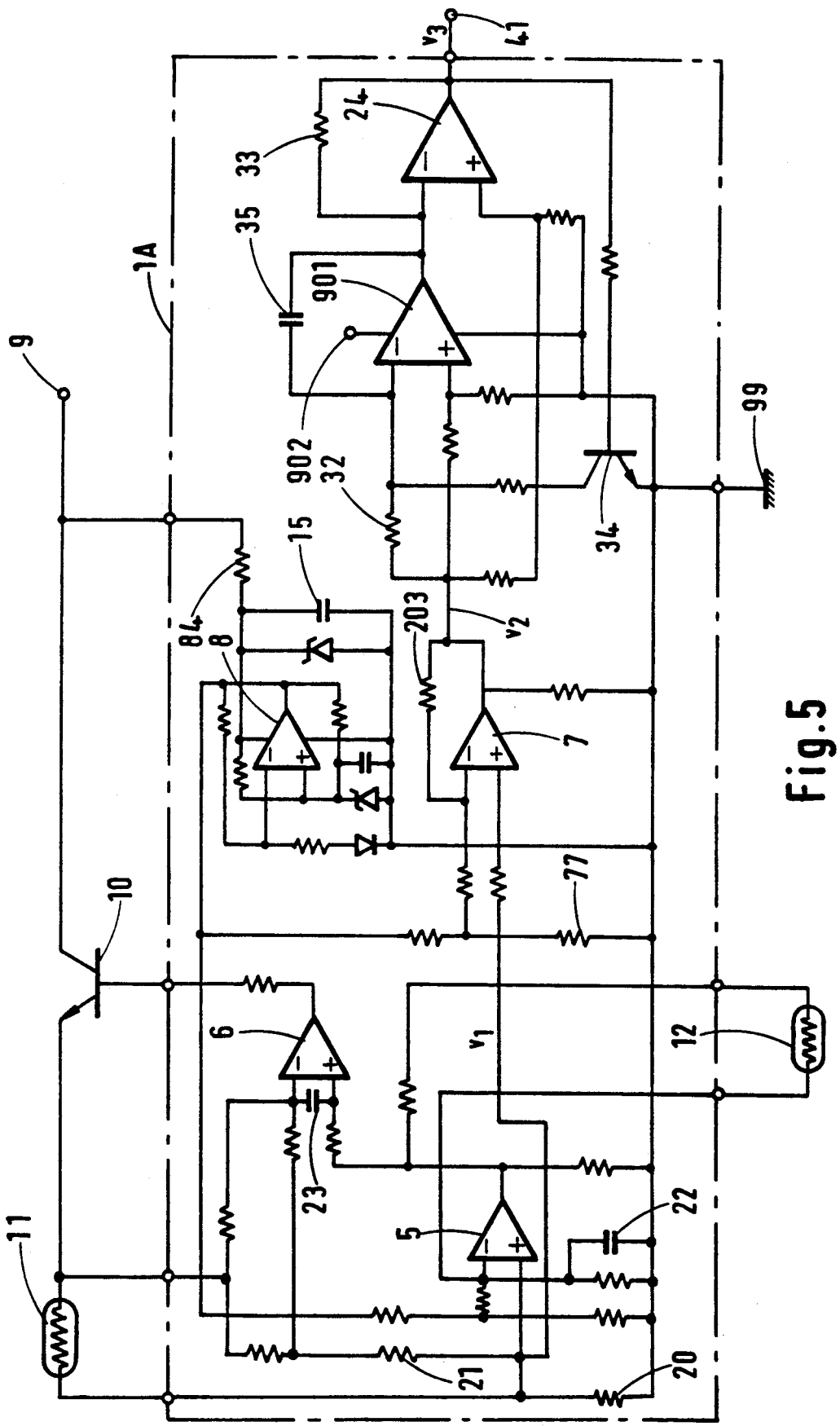
FIG. 5, FIG. 6, FIG. 7, FIG. 8, FIG. 9, FIG. 10 and FIG. 11 show circuit diagrams of respective embodiments of air flow meters in accordance with the present invention.

FIG. 5 shows an embodiment of the present invention circuit, and in the embodiment of FIG. 5, the conventional constant voltage control circuit 1, the zero/span circuit 2, the VCO 3 and the constant voltage circuit 4, as described above in connection with FIG. 1, are integrated into a single chip (semiconductor integrated circuit) 1A, and the elements outside the chip are only the hot wire 11, the cold wire 12, and transistor 10.

Figure 3:
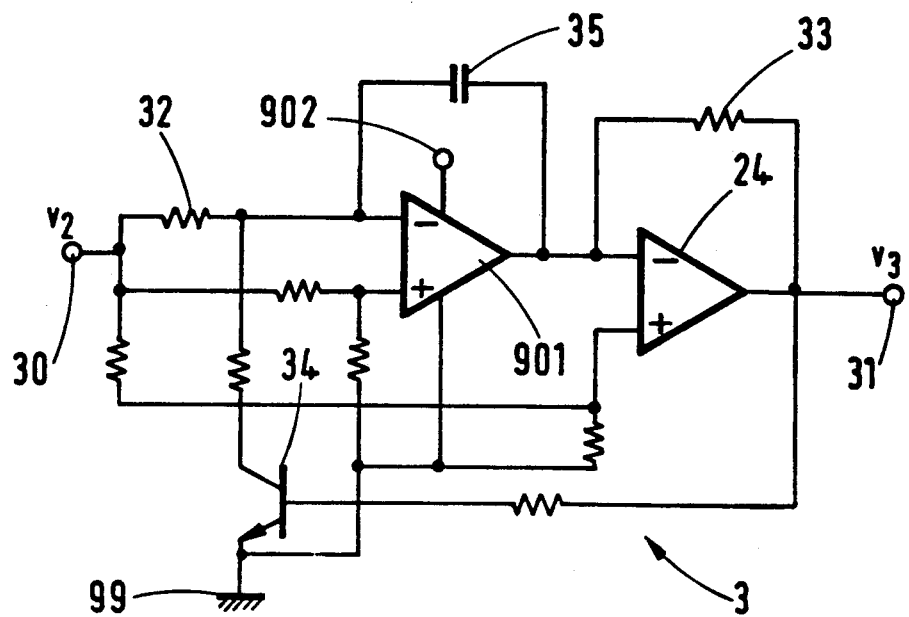
FIG. 3 is a circuit diagram showing one known example of a voltage controlled oscillator.

The operation of the circuit is substantially the same as that explained in connection with FIG. 2 and FIG. 3. However, the value of the elements such as the resistors and capacitors is adapted to facilitate the integration. Further, the Zener diode 14 for surge protection shown in FIG. 2 is eliminated because of the integration. This is because the VCO 3 is included in the integration and the terminal 30 (see FIG. 2) for the voltage $v_2$ is no longer taken outside the chip.

In the embodiment of FIG. 5, the meter is formed by the four portions comprising the silicon chip integrated circuit 1A, the hot wire 11, the cold wire 12 and the transistor 10, so that a sensor with no hybrid substrate is realized and an extremely small hot wire air flow meter is formed.

Figure 6:
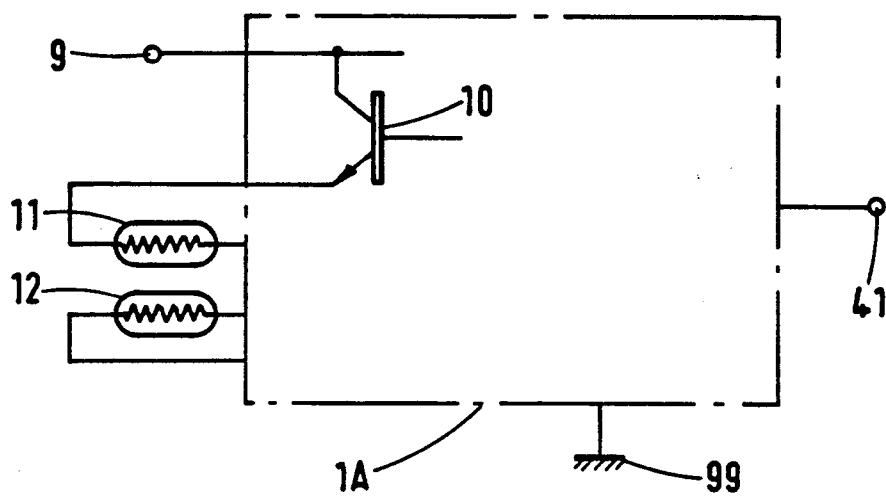

FIG. 6 is another embodiment of the present invention, in which the transistor 10 is also integrated into the chip 1A; therefore the number of terminals of the chip is reduced to seven which is the structure of a hot wire type air flow sensor having the smallest number of terminals currently conceivable.

Further, in this embodiment, since the transistor 10 is contained in the chip IA and the power loss is dissipated into the chip, the temperature in the chip is raised to a predetermined level by this heat generation. In other words, by varying the power consumption in the transistor, the chip temperature is freely set and the chip temperature is raised to a point at which the temperature characteristic thereof is most favorable, thereby the precision of the sensor itself is sufficiently enhanced.

Figure 7:
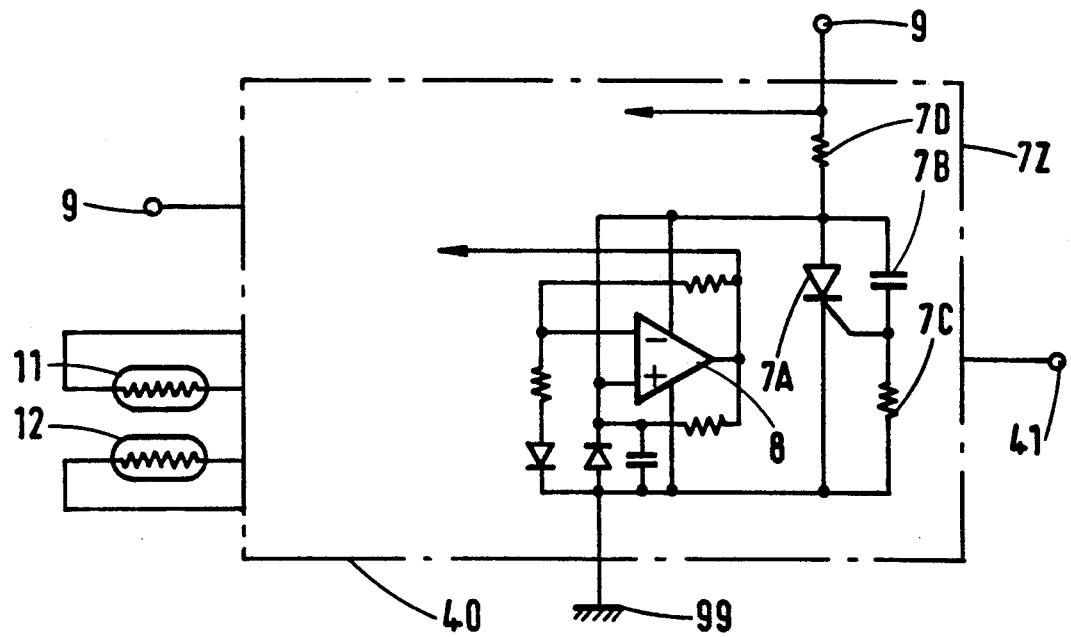

FIG. 7 is still another embodiment of the present invention, in which the surge protection function is realized by a thyristor circuit 7Z.

This thyristor 7Z is formed by a thyristor 7A, a capacitor 7B, and resistors 7C, 7D; the thyristor 7A is in an off condition at the normal source voltage (applied between the terminals 9 and 99) and the normal source voltage is applied to the operational amplifier 8.

However, when an abnormal voltage such as when a surge occurs which is applied at the terminal 9, since the rise of these voltages is usually rapid, the capacitor 7B and resistor 7C function as a differential circuit and the thyristor 7A is turned on and the voltage between both terminals is reduced to a low voltage about 1V, thereby the operational amplifier 8 is protected.

The thyristor is formed small in the chip in comparison with the conventionally employed Zener diode, the chip area is further reduced in comparison with the embodiment with the Zener diode shown in FIG. 5, and further, the protection operation is high-speed providing excellent protection for the circuit.

Figure 8:
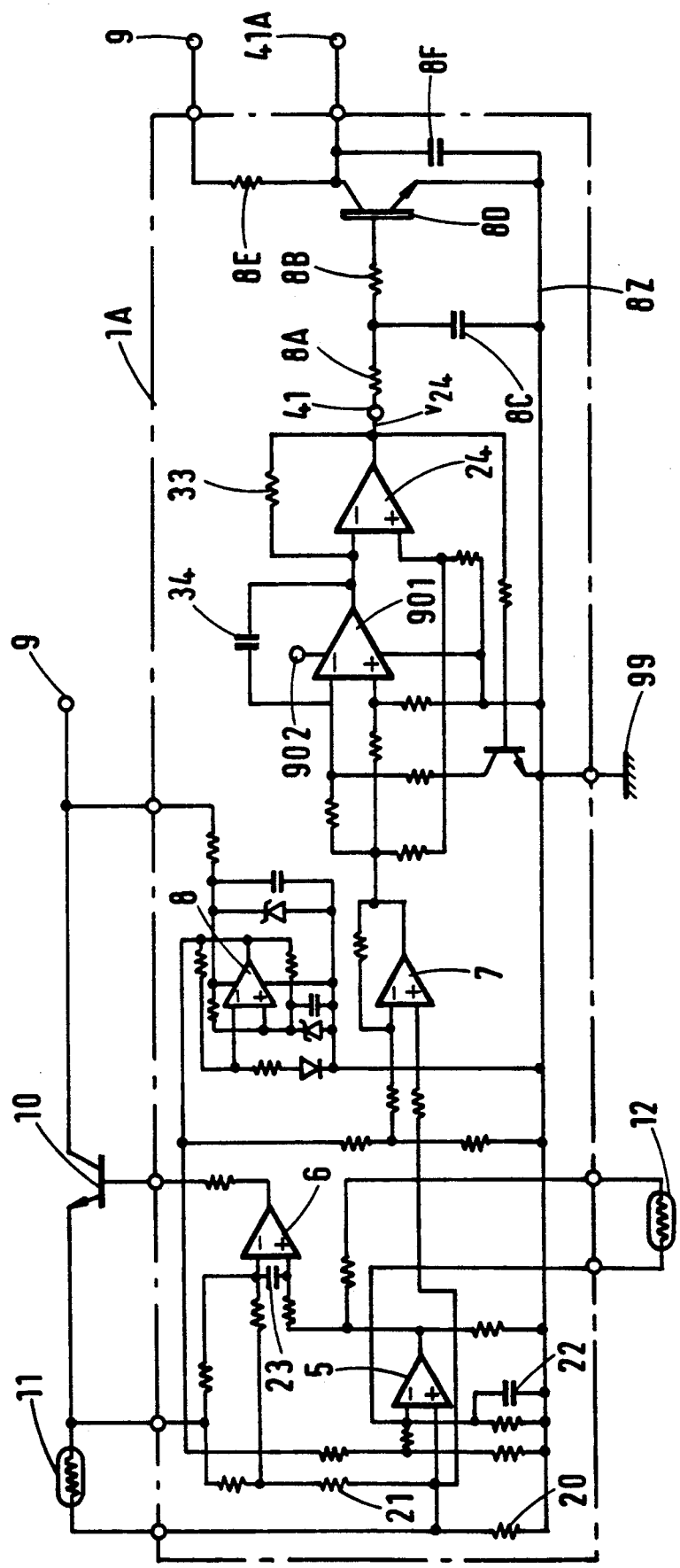

FIG. 8 is another embodiment of the present invention, in which a pulse waveform integrating type filter (dulling) circuit 8Z is also contained in the chip 1A.

The dulling circuit 8Z is for prolonging the rise and fall time of the output voltage waveform $v_{24}$ from the operational amplifier 24 to eliminate high frequency components in the waveform. Thus, circuit 8Z reduces electromagnetic disturbance induced to other machines by the otherwise high frequency components that would appear in the pulse output voltage at the terminal 41A.

The waveform integrator type filter (dulling) circuit 8Z in this embodiment is formed by resistors 8A, 8B, 8E, capacitors 8C, 8F and a transistor 8D, and the rise time is adjusted primarily by the resistor 8E and the capacitor 8F and the fall time primarily by the resistor 8A and the capacitor 8C.

Such a waveform dulling circuit 8Z is usually provided outside the chip. However, when it is built into the chip, as in the embodiment shown in FIG. 8, the area of the hybrid substrate does not increase very much, resulting in the advantage that the overall size of the meter itself is reduced.

Further, because of the integrated construction the circuit 8Z as a whole is affected by temperature in the same manner as the other circuits, so the advantage is achieved of improved temperature compensation.

Figure 9:
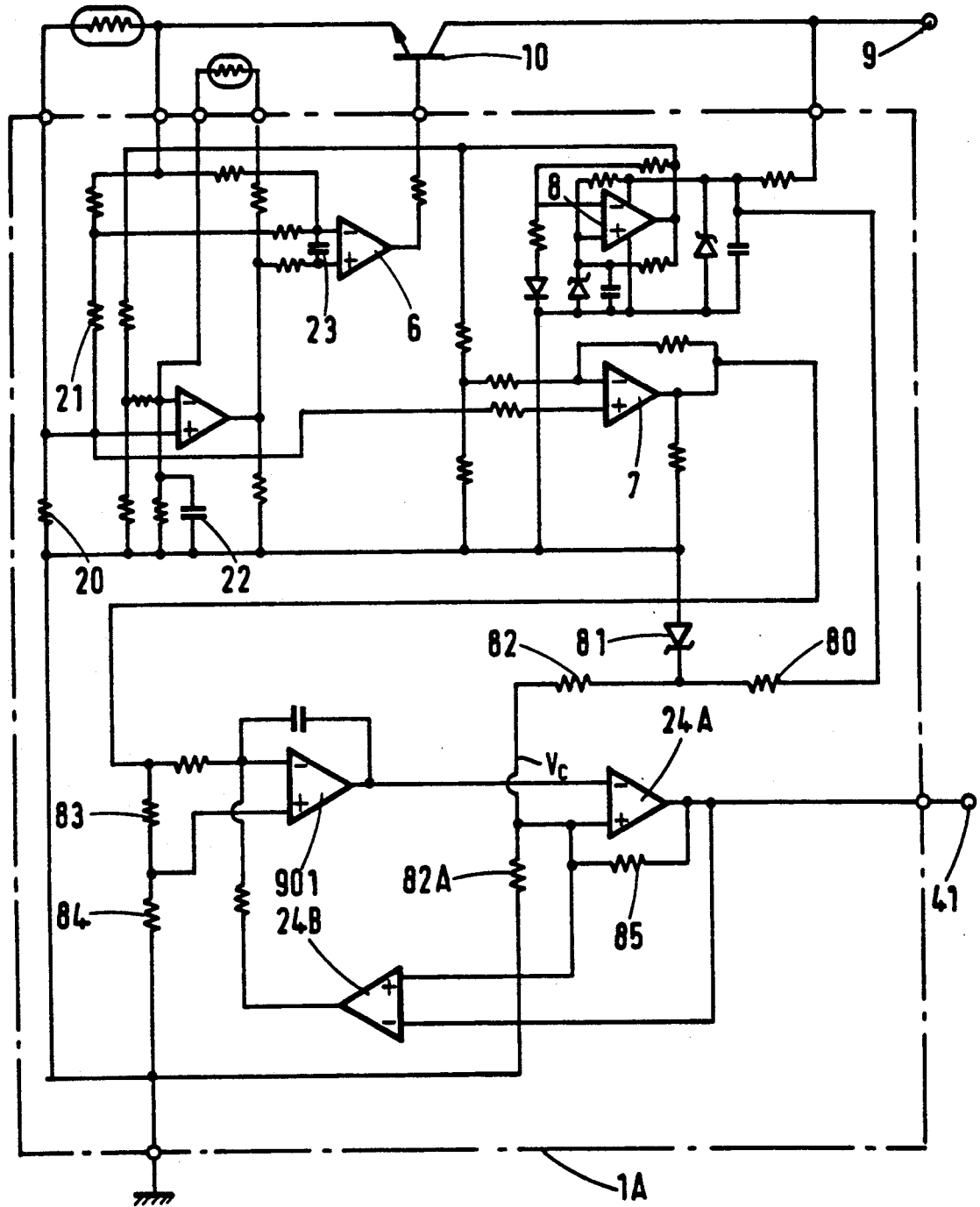

FIG. 9 is still another embodiment of the invention, in which, the VCO 3 is formed by operation amplifiers 901, 24B, a comparator 24A and resistors 83, 84, 85. However, the function of converting voltage into pulses having a frequency representative of the voltage is the same as in the preceding embodiments.

In this embodiment the comparator voltage $V_c$ (divided voltage by the resistors 82, 82A) of the comparator 24A is added to a temperature characteristic to enhance the temperature characteristic in the voltage-frequency conversion, the setting of this temperature coefficient being realized by varying the current flowing into the Zener diode 81 (usually the temperature coefficient of the Zener diode varies depending on the current flowing therethrough), and this is performed by changing the resistance value of the resistor 80.

Accordingly, in this embodiment, since the voltage $V_c$ is determined by the resistor division ratio 82A/(82+82A) of the resistors 82, 82A, the temperature influence by the resistors 82, 82A themselves during the compensation can be reduced, thereby further facilitating high precision.

Figure 10:
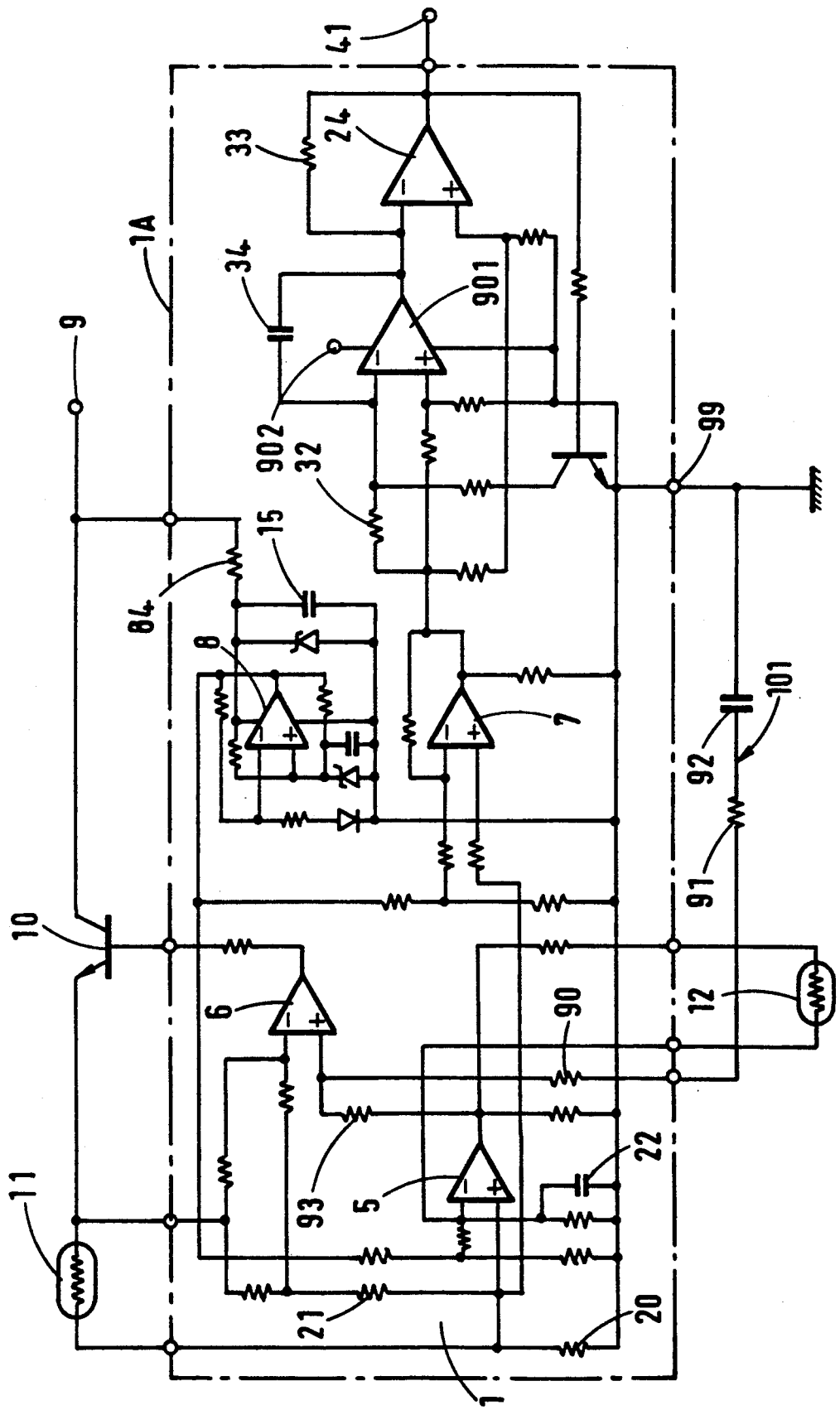

FIG. 10 is yet a further embodiment of an air flow meter incorporating this invention, in which a phase compensating circuit 101 is provided in the constant temperature control circuit 1 for improving the transient characteristic of the air flow sensor (specifically a frequency change of the pulse output voltage in response to changes in air flow rate), the present compensating circuit being constituted by resistors 90, 91, 93 and a capacitor 92. Accordingly, by properly selecting the values of these elements, the transient characteristic is improved.

Further, in this embodiment, the resistors 90, 93 are also contained in the chip 1A, thereby, the adjustment of its characteristic is more precisely performed. Namely, by making resistor 90 the approximate value of the resistance required to be presented by the combination of resistors 90 and 91 and by making resistor 91 a relatively low resistance value which can be laser trimmed, so a good precision on a hybrid substrate, and an enhancement of the characteristic, is achieved.

Figure 11:
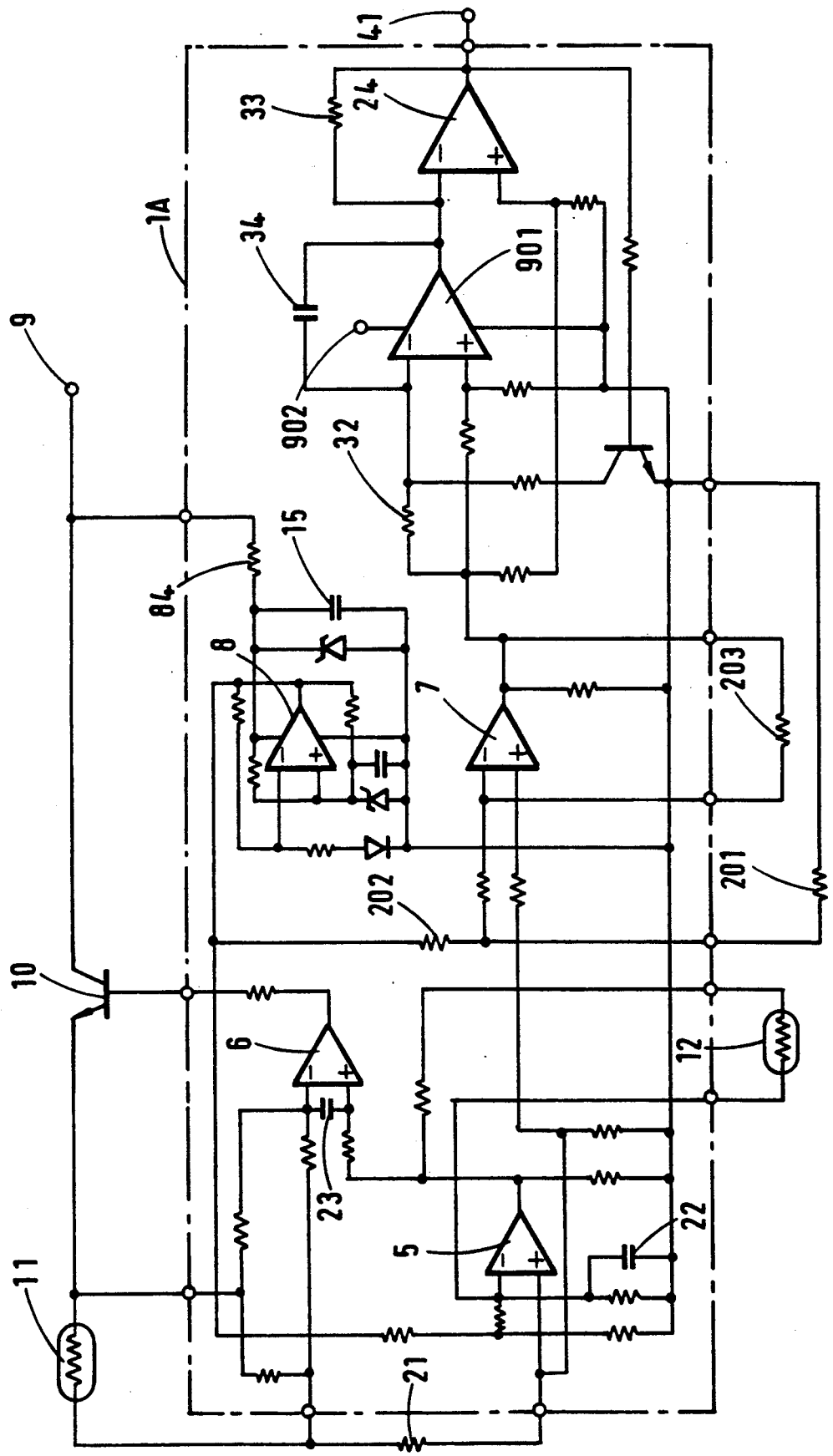

FIG. 11 is another embodiment of an air flow meter incorporating this invention, in which, the resistors such as 21, 201, 203 are located outside the chip 1A, and by suitable trimming of these resistors the precision of the sensor is enhanced. Namely the resistors such as 21, 201, 203 are produced as resistors on the hybrid substrate, and characteristic dispersion and temperature coefficient of these resistors is small in comparison with the resistors (which are formed by diffusion in a semiconductor) in the chip, and laser trimming on the hybrid substrate enables greater precision of the sensor.

Figure 12:
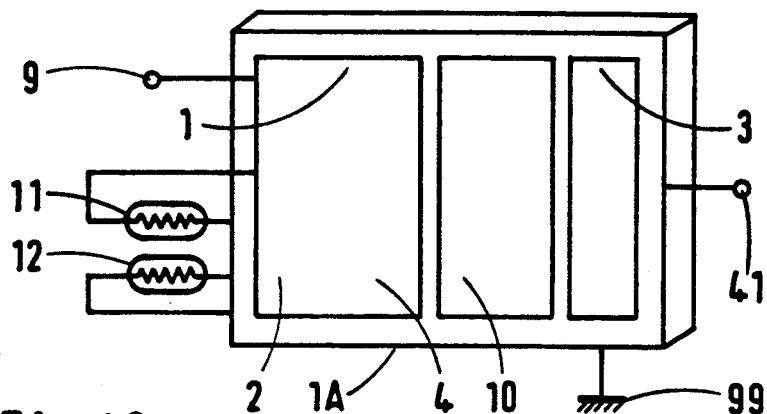
FIG. 12 shows a preferred chip layout.

FIG. 12 shows an arrangement of the circuits to be integrated and the transistor within the chip, in which the analog series circuits, such as the constant temperature control circuit 1, the zero/span circuit 2, the constant voltage source circuit 4, and the digital (pulse) series circuit of the VCO 3 are arranged on respective sides of the transistor 10.

With the arrangement shown in FIG. 12, the analogue series circuits 1, 2, 4 are physically isolated from the digital series circuit 3 by the transistor 10, and thereby electrical coupling and interference (in particular electrostatic coupling) between both circuits is reduced. This is because the electrical noise is shielded by the transistor 10. Thus, high noise resistance and high reliability is obtained.

Figure 13:
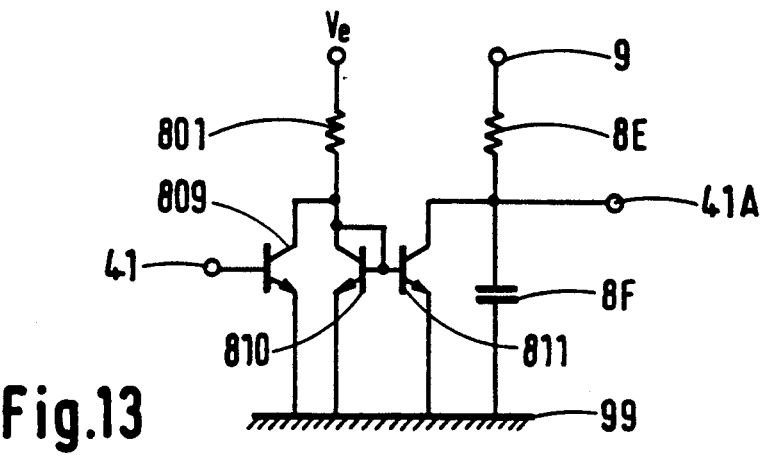
FIGS. 13 and 14 each show an integrator type filter (dulling) circuit in accordance with a feature of this invention for use in the air flow meter of this invention.
Figure 14:
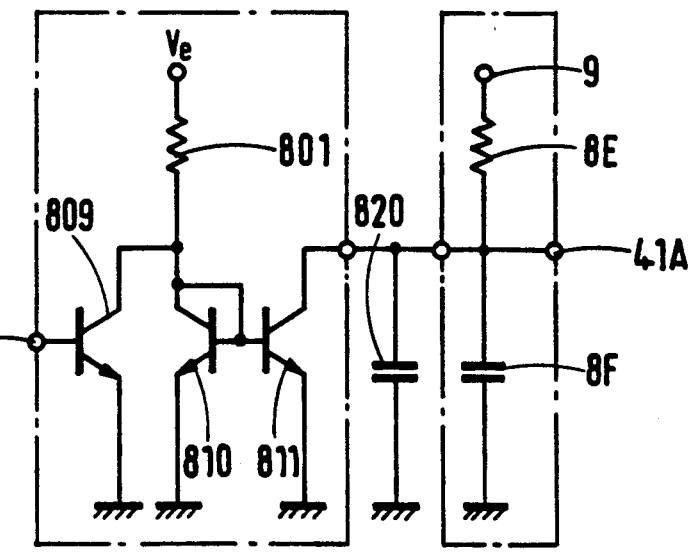

FIGS. 13 and 14 each show an integrator type filter (dulling) circuit in accordance with a feature of this invention for use with an air flow meter.

Because the dulling circuit of FIG. 8 requires capacitor 8C which must be a high value capacitor which takes up a great deal of room on an integrated circuit chip so new dulling circuits have been devised which are shown in FIGS. 13 and 14.

The dulling circuit shown in FIG. 13 is connected to terminal 41 and comprises a switching n-p-n transistor 809 having the base thereof connected to terminal 41, the emitter connected to earth potential and the collector thereof connected to potential $V_e$ via bias resistor 801. The collector of transistor 809 is also connected to the collector and base of an n-p-n transistor 810, the emitter of transistor 810 also being connected to earth potential. The base electrode of transistor 810 is connected to the base of an n-p-n transistor 811, the collector of which is connected to the junction of the load resistance 8E and capacitor 8F. Transistor 811 also has a grounded emitter electrode. The transistors 810, and 811 form a current Miller source. In operation, when transistor 809 is pulsed OFF, the potential of the collectors of transistors 809, 810 and of the bases of transistors 810, 811 rises and current flows through transistor 810. As a consequence, the voltage at the collector of transistor 811 drops to approximately earth potential with the result that the voltage output at terminal 41A decays with a time constant given by the division of the value of capacitor 8F by the current flowing in the collector of transistor 811. When transistor 809 switches ON, the transistors 810 and 811 cut OFF with the result that the voltage at terminal 41A increases, current flows through capacitor 8F and the voltage across capacitor 8F, i.e. at terminal 41A, rises with a time constant given by the product of the values of resistor 8E and capacitor 8F.

In the embodiment of FIG. 14, the dulling circuit is provided with an external capacitor 820. Because the capacitor 8F is arranged to be a so-called "feed through" type capacitor known per se, it is known that such capacitors are greatly affected by temperature. The capacitor 8F located externally of the LSI, on the other hand, has very good temperature compensation.

By connecting capacitors 8F and 82O in parallel, the result is obtained that the temperature compensation approximates to that of capacitor 82O, i.e. the temperature compensation is good.

In the present invention, the respective constituent elements of the meter apart from the hot and cold wires can be integrated into a common chip, resulting in the advantages that the sensor itself is small-sized and the number of lead terminals to the outside is reduced. Therefore, external influences such as from surge voltage and electromagnetic wave (radio wave) hardly affect the meter and the precision thereof is enhanced by improved temperature compensation by making use of the temperature distribution in the chip.

It is to be understood that the invention has been described with reference to exemplary embodiments, and modifications may be made without departing from the spirit and scope of the invention as defined in the appended claims.

We claim:

1. A hot wire air flow meter adapted to produce a pulse output including the combination of a hot wire element for detecting air flow rate, a cold wire element for detecting air temperature, and an electronic circuit for producing said pulse output which circuit includes at least a constant temperature control circuit for controlling the current flowing through the hot wire element to maintain the temperature thereof substantially constant, a zero/span circuit for compensating and modifying the output characteristic of said hot wire element, a voltage-frequency conversion circuit for receiving output from said zero/span circuit, and a surge protection circuit formed by a thyristor, at least part of said constant temperature control circuit, and all of said zero/span circuit, said voltage-frequency conversion circuit, and said thyristor being formed on a common semiconductor chip to form an integrated circuit, whereby air flow rate detected by said hot wire element is output as pulse density signals by said voltage-frequency conversion circuit.

2. A hot wire air flow meter according to claim 1, wherein a power transistor for controlling heating current for said hot wire element and included in said constant temperature control circuit is disposed separately outside said semiconductor chip.

3. A hot wire air flow meter according to claim 1, wherein a power transistor for controlling heating current for said hot wire element and included in said constant temperature control circuit is disposed on said semiconductor chip.

4. A hot wire air flow meter according to claim 1, wherein trimming resistor elements included in said electronic circuit are disposed separately outside said semiconductor chip and are mounted on a hybrid circuit substrate.

5. A hot wire air flow meter according to claim 1 wherein said electronic circuit includes an integrating filter (waveform dulling) circuit for the pulse signal output which is formed on said common semiconductor chip.

6. A hot wire air flow meter according to claim 3 wherein an analog circuit portion constituted by said constant temperature control circuit and a digital circuit portion constituted by said voltage-frequency conversion circuit are located on respective opposite sides of said power transistor for controlling current for said hot wire element on said semiconductor chip.

7. A hot wire air flow meter according to claim 1 including switching means adapted to receive said pulse density signals from said voltage-frequency conversion circuit and to control a current Miller source means, said current Miller source means, having an output terminal connected to a junction between a serially connected resistance and a capacitance, said resistance and capacitance being connected across a voltage supply source and said junction being adapted to provide a pulsed output voltage having a rising time constant given by the product of the values of the resistance and capacitance and a falling time constant given by the division of the capacitance by the current flowing from the voltage supply source, through the resistance to the current Miller source means.

8. A hot wire meter according to claim 6 wherein the switching means, the current Miller source means, the resistance and the capacitance are provided on a common semiconductor substrate and a further capacitance is connected in parallel with said capacitance but externally of said substrate.

9. A hot wire meter according to claim 6 wherein the switching means is a transistor.

10. A hot wire meter according to claim 7 wherein the current Miller source means comprises a pair of transistors one of which is connected to said switching means, said pair of transistors having the base electrodes thereof commonly connected, the emitter electrode thereby commonly connected to a potential source, and the base and collector electrodes of the transistor connected to said switching means being interconnected.

11. A hot wire air flow meter adapted to produce a pulse output including the combination of a hot wire element for detecting air flow rate, a cold wire element for detecting air temperature, and an electronic circuit for producing said pulse output which circuit includes at least a constant temperature control circuit for controlling the current flowing through the hot wire element to maintain the temperature thereof substantially constant, a zero/span circuit for compensating and modifying the output characteristic of said hot wire element a voltage-frequency conversion circuit for receiving output from said zero/span circuit, at least part of said constant temperature control circuit, and all of said zero/span circuit, and said voltage-frequency conversion circuit being formed on a common semiconductor chip to form an integrated circuit, and a power transistor for controlling heating current for said hot wire element is included in said constant temperature control circuit and is disposed on said semiconductor chip, wherein an analog circuit portion constituted by said constant temperature control circuit and a digital circuit portion constituted by said voltage-frequency conversion circuit are located on respective opposite sides of said power transistor for controlling current for said hot wire element on said semiconductor chip, whereby air flow rate detected by said hot wire element is output as pulse density signals by said voltage-frequency conversion circuit.

12. A hot wire air flow meter according to claim 11, wherein a power transistor for controlling heating current for said hot wire element and included in said constant temperature control circuit is disposed separately outside said semiconductor chip.

13. A hot wire air flow meter according to claim 11, wherein trimming resistor elements included in said electronic circuit are disposed separately outside said semiconductor chip and are mounted on a hybrid circuit substrate.

14. A hot wire air flow meter according to claim 11, wherein said electronic circuit includes a surge protection circuit located on said common semiconductor chip.

15. A hot wire air flow meter according to claim 14, wherein said surge protection circuit is formed by a thyristor.

16. A hot wire air flow meter according to claim 11 wherein said electronic circuit includes an integrating filter (waveform dulling) circuit for the pulse signal output which is formed on said common semiconductor chip.

17. A hot wire air flow meter according to claim 11 including switching means adapted to receive said pulse density signals from said voltage-frequency conversion circuit and to control a current Miller source means, said current Miller source means, having an output terminal connected to a junction between a serially connected resistance and a capacitance, said resistance and capacitance being connected across a voltage supply source and said junction being adapted to provide a pulsed output voltage having a rising time constant given by the product of the values of the resistance and capacitance and a falling time constant given by the division of the capacitance by the current flowing from the voltage supply source, through the resistance to the current Miller source means.

18. A hot wire meter according to claim 17 wherein the switching means, the current Miller source means, the resistance and the capacitance are provided on a common semiconductor substrate and a further capacitance is connected in parallel with said capacitance but externally of said substrate.

19. A hot wire meter according to claim 17 wherein the switching means is a transistor.

20. A hot wire meter according to claim 17 wherein the current Miller source means comprises a pair of transistors one of which is connected to said switching means, said pair of transistors having the base electrodes thereof commonly connected, the emitter electrode thereby commonly connected to a potential source, and the base and collector electrodes of the transistor connected to said switching means being interconnected.

21. A hot wire air flow meter adapted to produce a pulse output including the combination of a hot wire element for detecting air flow rate, a cold wire element for detecting air temperature, and an electronic circuit for producing said pulse output which circuit includes at least a constant temperature control circuit for controlling the current flowing through the hot wire element to maintain the temperature thereof substantially constant, a zero/span circuit for compensating and modifying the output characteristic of said hot wire element, a voltage-frequency conversion circuit for receiving output from said zero/span circuit, whereby air flow rate detected by said hot wire element is output as pulse density signals by said voltage-frequency conversion circuit, switching means adapted to receive said pulse density signals from said voltage-frequency conversion circuit and to control a current Miller source means, said current Miller source means, having an output terminal connected to a junction between a serially connected resistance and a capacitance, said resistance and capacitance being connected across a voltage supply source and said junction being adapted to provide a pulsed output voltage having a rising time constant given by the product of the values of the resistance and capacitance and a falling time constant given by the division of the capacitance by the current flowing from the voltage supply source, through the resistance to the current Miller source means, at least part of said constant temperature control circuit, and all of said zero/span circuit, said voltage-frequency conversion circuit, said switching means and said current Miller source means being formed on a common semiconductor chip to form an integrated circuit.

22. A hot wire meter according to claim 21 wherein a further capacitance is connected in parallel with said capacitance but externally of said semiconductor chip.

23. A hot wire meter according to claim 21 wherein the switching means is a transistor.

24. A hot wire meter according to claim 21 wherein the current Miller source means comprises a pair of transistors one of which is connected to said switching means, said pair of transistors having the base electrodes thereof commonly connected, the emitter electrode thereby commonly connected to a potential source, and the base and collector electrodes of the transistor connected to said switching means being interconnected.

25. A hot wire air flow meter according to claim 21, wherein a power transistor for controlling heating current for said hot wire element and included in said constant temperature control circuit is disposed separately outside said semiconductor chip.

26. A hot wire air flow meter according to claim 21, wherein a power transistor for controlling heating current for said hot wire element and included in said constant temperature control circuit is disposed on said semiconductor chip.

27. A hot wire air flow meter according to claim 21, wherein trimming resistor elements included in said electronic circuit are disposed separately outside said semiconductor chip and are mounted on a hybrid circuit substrate.

28. A hot wire air flow meter according to claim 21, wherein said electronic circuit includes a surge protection circuit located on said common semiconductor chip.

29. A hot wire air flow meter according to claim 28 wherein said surge protection circuit is formed by a thyristor.

30. A hot wire air flow meter according to claim 21 wherein said electronic circuit includes an integrating filter (waveform dulling) circuit for the pulse signal output which is formed on said common semiconductor chip.

31. A hot wire air flow meter according to claim 26 wherein the analog circuit portion constituted by said constant temperature control circuit and a digital circuit portion constituted by said voltage-frequency conversion circuit are located on respective opposite sides of said power transistor for controlling current for said hot wire element on said semiconductor chip.

32. A hot wire air flow meter adapted to produce a pulse output including the combination of a hot wire element for detecting air flow rate, a cold wire element for detecting air temperature, and an electronic circuit for producing said pulse output which circuit includes at least a constant temperature control circuit for controlling the current flowing through the hot wire element to maintain the temperature thereof substantially constant, a zero/span circuit for compensating and modifying the output characteristic of said hot wire element, a voltage-frequency conversion circuit for receiving output from said zero/span circuit, and an integrating filter (waveform dulling) circuit for the pulse signal output whereby air flow rate detected by said hot wire element is output as pulse density signals by said voltage-frequency conversion circuit, at least part of said constant temperature control circuit, and all of said zero/span circuit, said voltage-frequency conversion circuit, and said integrating circuit being formed on a common semiconductor chip to form an integrated circuit.

33. A hot wire meter as claimed in claim 32 wherein the voltage-frequency conversion circuit comprises a voltage controlled oscillator including an integrator connected to receive a bias voltage and to supply one input of a comparator, the other input of said comparator being connected to temperature coefficient setting means for enhancing the temperature characteristic of said voltage controlled oscillator, the output of said comparator providing said pulse output.

34. A hot wire meter as claimed in claim 33 wherein the temperature coefficient setting means comprises a resistive potential divider connected to have the voltage thereacross to be controlled by a temperature coefficient dependent device.

35. A hot wire meter as claimed in claim 34 wherein the temperature coefficient dependent device is a zener diode in series with a resistor.

36. A hot wire air flow meter according to claim 32, wherein a power transistor for controlling heating current for said hot wire element and included in said constant temperature control circuit is disposed separately outside said semiconductor chip.

37. A hot wire air flow meter according to claim 32, wherein a power transistor for controlling heating current for said hot wire element and included in said constant temperature control circuit is disposed on said semiconductor chip.

38. A hot wire air flow meter according to claim 32, wherein trimming resistor elements included in said electronic circuit are disposed separately outside said semiconductor chip and are mounted on a hybrid circuit substrate.

39. A hot wire air flow meter according to claim 32, wherein said electronic circuit includes a surge protection circuit located on said common semiconductor chip.

40. A hot wire air flow meter according to claim 39 wherein said surge protection circuit is formed by a thyristor.

41. A hot wire air flow meter according to claim 37 wherein an analog circuit portion constituted by said constant temperature control circuit and a digital circuit portion constituted by said voltage-frequency conversion circuit are located on respective opposite sides of said power transistor for controlling current for said hot wire element on said semiconductor chip.

42. A hot wire air flow meter according to claim 32 including switching means adapted to receive said pulse density signals from said voltage-frequency conversion circuit and to control a current Miller source means, said current Miller source means, having an output terminal connected to a junction between a serially connected resistance and a capacitance, said resistance and capacitance being connected across a voltage supply source and said junction being adapted to provide a pulsed output voltage having a rising time constant given by the product of the values of the resistance and capacitance and a falling time constant given by the division of the capacitance by the current flowing from the voltage supply source, through the resistance to the current Miller source means.

43. A hot wire meter according to claim 42 wherein the switching means, the current Miller source means, the resistance and the capacitance are provided on a common semiconductor substrate and a further capacitance is connected in parallel with said capacitance but externally of said substrate.

44. A hot wire meter according to claim 42 wherein the switching means is a transistor.

45. A hot wire meter according to claim 42 wherein the current Miller source means comprises a pair of transistors one of which is connected to said switching means, said pair of transistors having the base electrodes thereof commonly connected, the emitter electrode thereby commonly connected to a potential source, and the base and collector electrodes of the transistor connected to said switching means being interconnected.

* * * * *